United States Patent [19]

Hoffart

[11] Patent Number: 5,341,216
[45] Date of Patent: Aug. 23, 1994

[54] CATV CHANNEL ACCESS CONTROL AND METERING APPARATUS

[75] Inventor: William K. Hoffart, Saskatchewan, Canada

[73] Assignee: Saskatchewan Telecommunications, Canada

[21] Appl. No.: 588,732

[22] Filed: Sep. 27, 1990

[30] Foreign Application Priority Data

Sep. 29, 1989 [CA] Canada .................................. 615477

[51] Int. Cl.⁵ ..................... H04N 7/10; H04N 7/14; H04H 1/02
[52] U.S. Cl. ......................... 348/1; 455/4.2; 348/3; 348/6
[58] Field of Search ..................... 455/2, 3.3, 4.1, 4.2, 455/5.1, 6.1, 6.2; 358/84, 86, 88; 380/7, 10, 20; 379/67, 88, 121, 140, 146; 359/125, 146, 148

[56] References Cited

U.S. PATENT DOCUMENTS

| | | | |
|---|---|---|---|
| 3,021,383 | 2/1962 | Mountjoy et al. | 358/84 |
| 3,396,232 | 8/1968 | Hendrickson et al. | 178/5.1 |
| 3,716,654 | 2/1973 | Hendrickson et al. | 178/5.1 |
| 3,733,430 | 5/1973 | Thompson et al. | 178/5.1 |
| 4,008,369 | 2/1977 | Theurier et al. | 358/84 |
| 4,163,255 | 7/1979 | Pires | 358/122 |
| 4,313,132 | 1/1982 | Doles et al. | 358/114 |
| 4,475,121 | 10/1984 | Yashiro | 455/2 |
| 4,475,123 | 10/1984 | Dumbauld et al. | 358/114 |
| 4,550,341 | 10/1985 | Naito | 358/84 |
| 4,759,060 | 7/1988 | Hayashi et al. | 455/2 |
| 4,878,245 | 10/1989 | Bradley et al. | 455/4.1 |
| 4,947,429 | 8/1990 | Bestler | 358/84 |
| 4,961,109 | 10/1990 | Tanaka | 455/2 |
| 5,007,077 | 4/1991 | Fields et al. | 379/67 |
| 5,027,426 | 6/1991 | Chiocca, Jr. | 455/5.1 |

FOREIGN PATENT DOCUMENTS

| | | | |
|---|---|---|---|
| 673322 | 10/1963 | Canada | 350/2 |
| 787005 | 6/1968 | Canada | 350/2 |
| 808825 | 3/1969 | Canada | 340/101 |
| 1140668 | 2/1983 | Canada | 350/22 |
| 167237 | 1/1986 | European Pat. Off. | |
| 3819582 | 12/1989 | Fed. Rep. of Germany | 455/2 |

*Primary Examiner*—Reinhard J. Eisenzopf
*Assistant Examiner*—Lisa Charouel
*Attorney, Agent, or Firm*—Venable, Baetjer, Howard & Civiletti

[57] ABSTRACT

A communications device is disclosed for use between a CATV distribution line and a plurality of CATV subscribed premises for monitoring the utilization of each subscriber of a plurality of subscribers of TV channels distributed over the CATV distribution line. The devise comprises a subscriber status monitor associated with each subscriber premises of the plurality of subscribers for connection to the distribution line and delivering one or more of the TV channels to the associated subscriber. Each monitor includes filters responsive to a subscriber generated activation signal to block out or pass the TV channels and prevent the activation signal from propagating into the distribution line, a status indicator electrically connected to the filters for producing an output signal indicating whether the TV channels are blocked out or delivered to the subscriber premises, and an addressable asynchronous receiver transmitter responsive to a unique electrically encoded address signal received over a communications bus separate from the distribution line for transmitting over the communications bus the output signal of the status indicator of each of the subscriber status monitors.

8 Claims, 3 Drawing Sheets

CATV CHANNEL ACCESS CONTROL AND METERING APPARATUS

BACKGROUND OF THE INVENTION

This invention relates generally to apparatus for signalling subscriber usage of a cable television service and more particularly to a cable television (CATV) distribution system where pay for use television signals are distributed. In such a television distribution system it is necessary to monitor or record the utilization of the pay TV channels to enable billing for use or consumption thereof to be done.

Numerous techniques have been devised to bill subscribers of a cable television system for access to television signals carried on the system. Subscribers may pay a fixed monthly or weekly charge for access to the system. They may pay on a per-program basis or on a per unit-of-use basis.

This invention is for use in conjunction with billing on a per unit-of-use basis. It will be appreciated that such billing may be the only billing charged a subscriber or that such billing may be in addition to a fixed charge billing system or any other billing that may be conceived of by a cable operator.

In the past, to achieve a per unit-of-use billing many systems have been proposed. One example is the coin box type system as exemplified in U.S. Pat. No. 3,021,383 wherein each subscriber is provided with a coin box into which the subscriber must deposit money to gain timed access to television signals carried on the system. It will be appreciated that operation of such a system is labour intensive as personnel must be dispatched to empty the coin boxes on a frequent basis. Moreover, each subscriber is required to have the necessary coins on-hand to activate the coin boxes.

Another approach is to provide an access number for access by subscribers wishing to have access to television signals carried on the cable network that must be dialled by each subscriber desiring access. Such a system may become overloaded when a large number of subscribers call in to request access.

As may be appreciated, the foregoing systems inherently have a number of deficiencies including system complexity, intensive labour requirements and reliance on subscriber equipment or action to retrieve payment or billing information.

SUMMARY OF THE INVENTION

Accordingly, the present Invention relates generally to a novel method and system for billing a subscriber on a unit-of-use basis with a minimum of complex equipment and human intervention or support.

The invention further relates to a novel method and system for obtaining subscriber viewing information on a per subscriber basis periodically automatically without intervention by the subscriber or the cable system operator personnel.

The invention also relates to an automated system for the monitoring of viewing of television channels distributed over a cable network to a plurality of subscribers comprising:

at least one subscriber operable activation unit adapted to be electrically connected to said cable at each subscriber location for selectively applying an activation signal thereto;

filter means adapted to be inserted into the cable distribution network proximate to each subscriber location including a first filter responsive to said activation signal to block out or pass at least one television channel and a second filter to block out said activation signal to prevent said signal from propagating into said cable network;

status means proximate to each subscriber location for connection to a communications bus responsive to a unique electrically encoded address by producing a status signal on said communications bus corresponding to the presence or absence of said activation signal;

polling means for repetitively producing unique electrically encoded addresses on said communications bus and detecting the resultant status signal;

storage means for recording each encoded address and resultant status signal pair whereby the amount of time each subscriber has activated access to at least one television channel may be recorded.

The invention still further relates to a method for billing a subscriber of a pay television system for programs actually viewed by the subscriber at a subscriber location comprising the steps of:

transmitting at a predetermined carrier frequency at least one television channel into a cable network;

blocking said television channel at each subscriber location until passage of said television channel into said subscriber location is activated by subscriber action;

polling each subscriber location at predetermined intervals to obtain status information for the subscriber;

recording for each subscriber the status information obtained by polling each subscriber location.

These and other features and advantages of the present invention will become apparent to one skilled in the art to which the invention appertains from the following detailed description in conjunction with the accompanying drawings which illustrate, by way of example, preferred embodiments of the invention.

DETAILED DESCRIPTION

Figure 1:
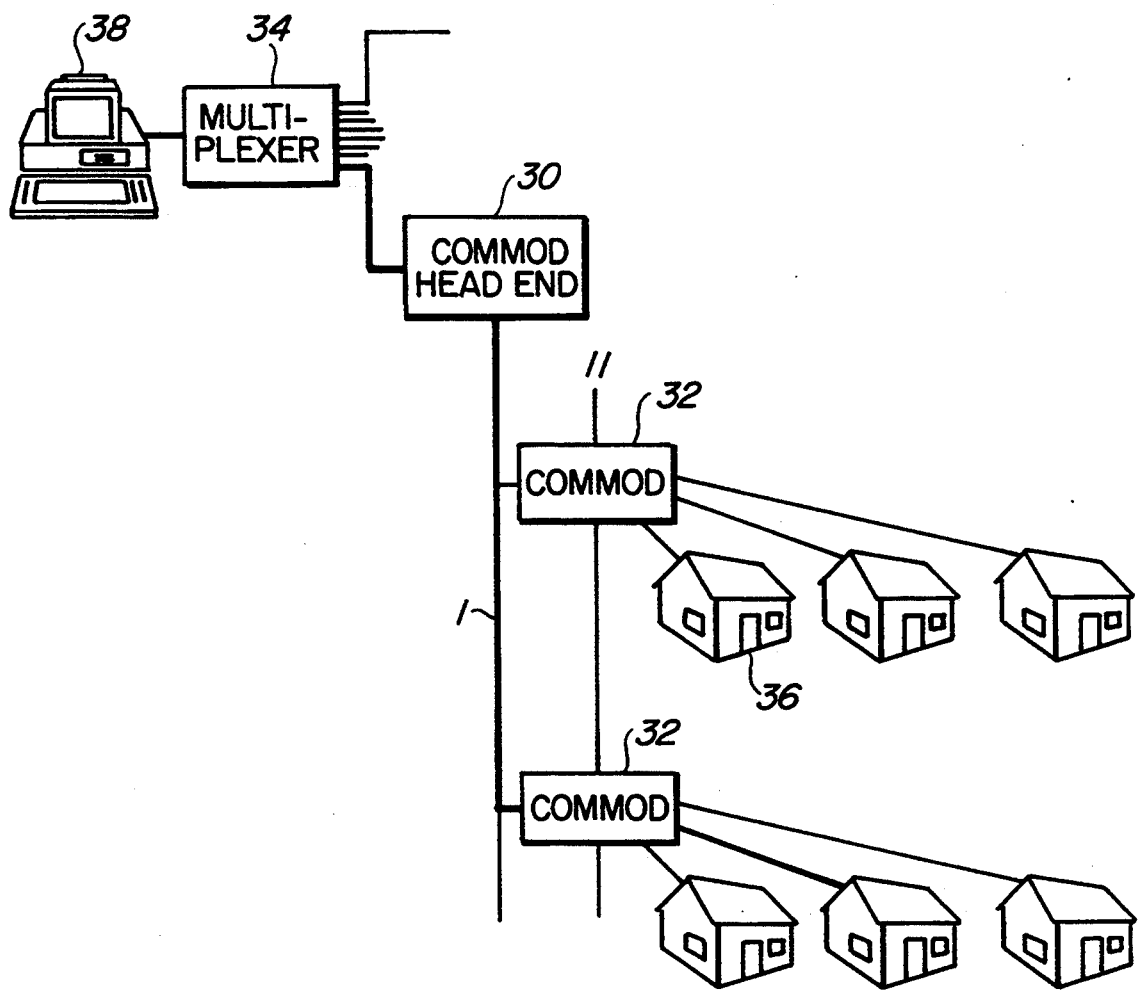
FIG. 1 is a perspective view of a distribution system employing the communications module.

Referring now to FIG. 1, an overview of the cable television CATV usage metering system employing the communications module may now be outlined. A CATV distribution line 11 is shown which distributes television signals to a plurality of households 36. Interposed between the households 36 and the CATV line is a communications module (COMMOD) 32 which is used to monitor the utilization or consumption of at least one of the TV channels distributed over the CATV lines by an individual one of the households. Each COMMOD may monitor a plurality of households. By way of example each COMMOD is shown to monitor 3 of the households. The result of the monitoring by each COMMOD is to maintain a status for each household indicating that the pay TV signal is or is not being used. This status information is polled from each COMMOD by a computer 38 which addresses a COM- MOD to be polled via polling apparatus including a computer 38 and a head-end unit 30 which communicates with a plurality of COMMODs over a single wire pair 1. Optionally several head-end units 30 may be multiplexer 34.

Figure 2:
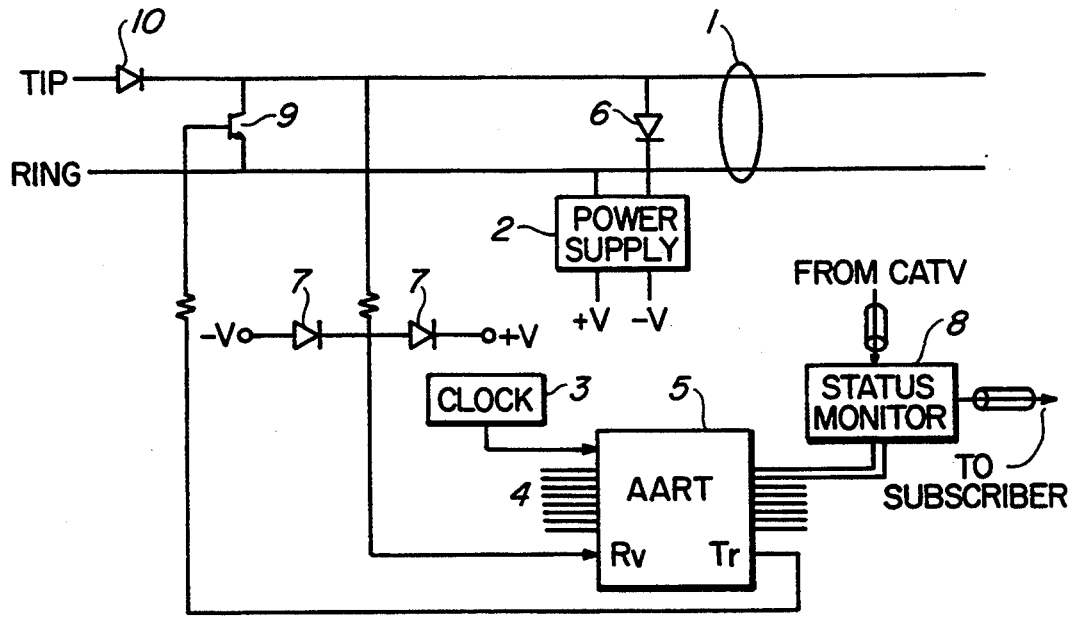
FIG. 2 is a functional block level diagram of the monitoring portion of the communications module.

Referring to FIG. 2 which shows a functional block diagram of the metering communications module (COMMOD) used to provide subscriber viewing status information to a central head-end monitor over a dedicated pair of telephone wires (a telephone pair). Each dedicated pair of telephone wires may have a plurality of COMMODs attached to it. The telephone pair 1 provides power to the COMMOD which is voltage regulated by power supply 2. The output voltages from the power supply are applied to the clock 3, address strap 4 and the addressable asynchronous receiver transmitter (AART) 5. Signalling from the central unit to the COMMOD is achieved by interrupting the supply voltage on the telephone pair 1. Thus isolation diode 6 is provided to prevent the signalling information from disrupting the circuit, s power supply. Signalling from the central unit arrives serially at the Rv terminal of the AART 5 and is clipped to the regulated supply voltage +V by diode pair 7. Diode pair 7 also prevents transient voltage spikes which may be present on the telephone pair 1 from damaging the AART by ensuring that the voltage levels arriving the Rv terminal of the AART do not exceed the supply voltages applied to the AART. The AART is a readily available conventional integrated circuit, for the example part number MC14469 manufactured by Motorola. The central unit signalling to the COMMOD comprises a serially transmitted COMMOD address. Each COMMOD's address is strapped using address strap 4 to an address which is unique among all COMMODs connected to telephone pair 1. Providing a unique address for each COMMOD enables the central unit to poll a plurality of COMMODS each responding to its own unique address. The AART responds to its polling address by capturing the status indication of up to 3 subscribers as provided by each subscriber's status monitor 8 which is described and shown in more detail in FIG. 3 and the description accompanying same. The subscriber status information is serially transmitted out of the Tr terminal of the AART at a speed set by clock 3. The transmitted signalling is applied to the telephone pair I via a transistor 9 which either saturates thus shorting the telephone pair 1 or remains open leaving telephone pair 1 unaffected.

Figure 3:
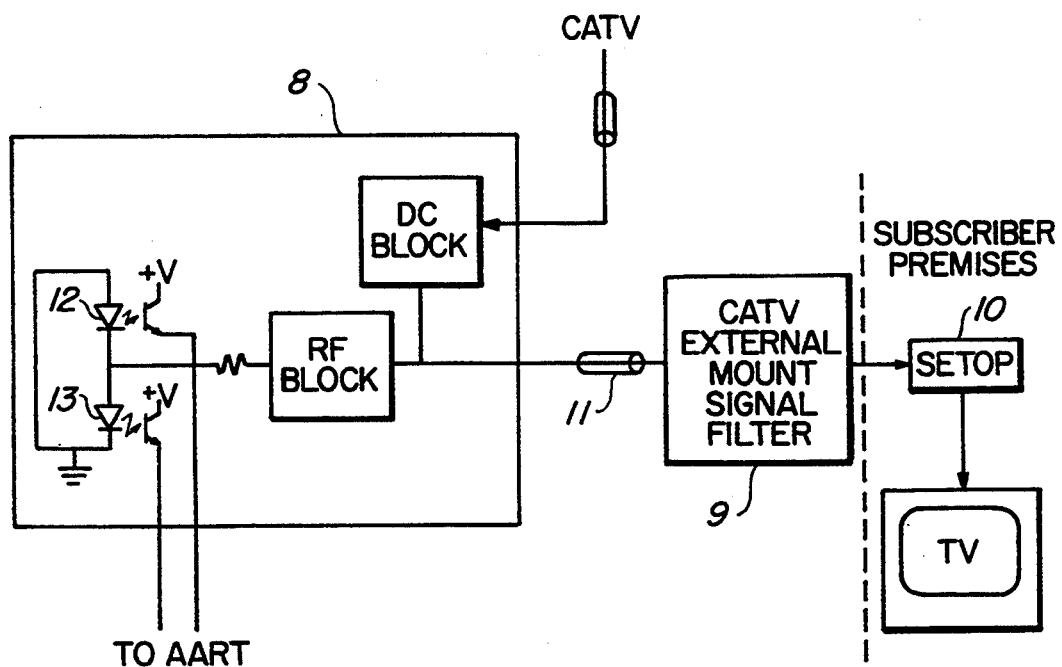
FIG. 3 is a functional block level diagram of the signal filtering portion of the communications module.

Referring now to FIG. 3, the subscriber status monitor 8 is shown in more functional detail. Each subscriber status monitor provides 2 status signals to the AART 5. The subscriber status monitor works in conjunction with a CATV filter 9 and set-top unit 10, the operation of which unit is detailed in U. S. patent application Ser. No. 005,979, now U.S. Pat. No. 4,878,245, incorporated herein by reference. In summary, the set-top unit 10 superimposes a positive or negative DC voltage on the CATV subscriber drop 11 which either activates or deactivates CATV signal filter 9. This switching of CATV signal filter 9 allows the subscriber to receive or be blocked from receiving premium TV signals carried on the CATV network. The DC voltage which is applied to the filter 9 via CATV line 11 is also passed along CATV line 11 to the subscriber status monitor 8. This DC voltage biases one and only one of the diodes in optoisolators 12 or 13. Thus the signals presented to the AART 5 by the subscriber status monitor 8 can be listed as follows:

00—no DC voltage applied, set-top unit 10 not powered
01—premium channel viewing enabled
10—premium channel viewing disabled
11—invalid, circuit alarm condition, a transmission or device failure.

It should be noted that the COMMOD must be designed to meet 2 objectives. First, power consumption should be minimized (i.e. no more than say 500 microamperes), as each telephone pair 1 supplies both the power to run the circuit as well as the signalling path between the plurality of COMMODs and the central unit. Secondly, the COMMOD is positioned outside in the subscriber distribution trunking and must therefore be able to operate in extreme temperature conditions (i.e. $-40°$ C. to $60°$ C.). To meet the temperature requirement for example, the capacitors used in the clock circuit 3 should be mica which has negligible capacitance variation over the operating temperature range compared to ceramic capacitors which have wide variation.

Figure 4:
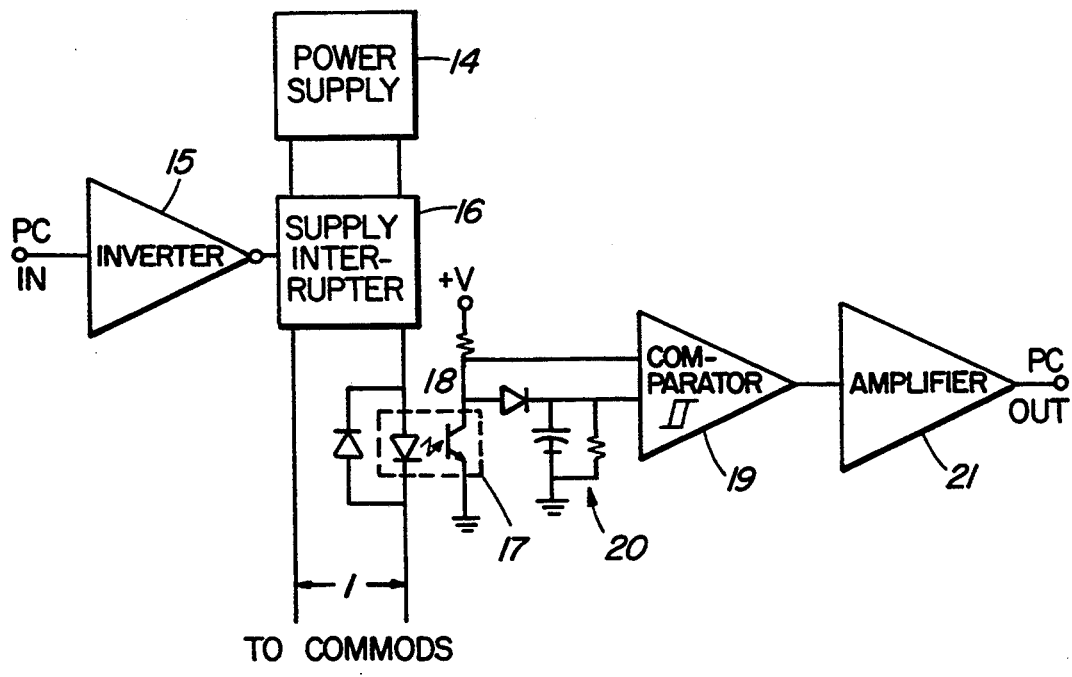
FIG. 4 is a functional block level diagram of the head-end portion of the communications module.

Referring now to FIG. 4, the configuration of the head-end or central unit provided for each dedicated telephone pair is shown in functional block diagram form. The head-end provides line power and a common polling communications path to each COMMOD. All COMMODs are line powered from power supply 14 which is affixed across telephone pair 1. Data signals comprising the address of the COMMOD to be polled are input to the central unit through the terminal labelled PC in. As the signals of the constructed embodiment are produced out an RS232C serial port of a personal computer, (PC - not shown) they are applied to a signal level converter and inverter 15. The inverted signal is applied to a supply interrupter 16 which disconnects the supply 14 from telephone pair 1 and provides an electrical short across telephone pair 1. Thus in a quiescent state, power supply 14 is connected to a telephone pair I supplying power to a plurality of COMMODs attached thereto. To poll a COMMOD, an address signal is communicated on telephone pair 1 by disconnecting power supply 14 via supply interrupter 16 and applying a short to the said pair 1. Signalling in this fashion may be made at 300 baud without significantly degrading power supplied to the COMMODS.

The polled COMMOD communicates its signalling back to receiving optoisolator 17 by shorting telephone pair 1. Shorting telephone pair 1 causes a rapid increase in current flows through pair 1 causing the transistor in optoisolator 17 to saturate thus decreasing the voltage at point 18 toward zero. The input voltage to the comparator 19 is rapidly decreased on one input but falls off slowly due to the RC time constant of the resistor-capacitor pair 20 on the other input. This difference in voltage causes the comparator 19 to trigger and this output is applied to the inverter buffer amplifier 21 which in turn is communicated back to the RS232C serial input port of the microcomputer or personal computer at the point labelled PC out.

Thus it will be understood that the signalling of the polled COMMOD by means of shorting telephone pair 1 is 300 baud in this example to allow the RS232C serial port of the personal computer to both send and receive data at the same rate. The comparator 19 and RC pair 20 are provided to allow the head-end circuitry to stabilize to a quiescent operating current on telephone pair 1 for a varying number of COMMODs (for example 1 to 100) and detect COMMOD signalling on the pair 1 without the need or requirement to tune or adjust the head-end for the varying number of COMMODs that may be attached.

Figure 5:
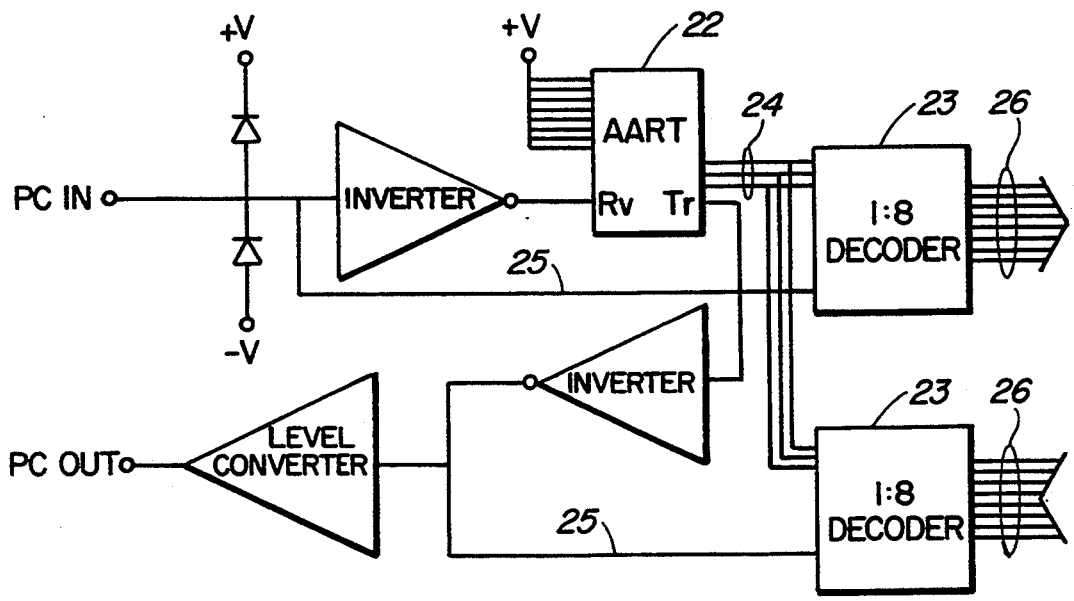
FIG. 5 is a functional block level diagram of a head-end multiplexer for the communications module.

FIG. 5 shows an alternate PC to head-end interface that allows the PC to select one of eight head-ends for signalling to any one of the COMMOD units connected to the dedicated telephone pair serviced by that head-end. This allows the microcomputer (pC) to poll up to eight times the number of COMMODs possible with the interface to a single telephone pair 1 described in conjunction with FIG. 4 above. Using the configuration of FIG. 5, a single address (for example octal 377) is reserved for addressing the multiplex control AART 22. This AART is configured to accept a control word three bits of which are used to select an analogue multiplexer via address lines 24 which interconnect the control word latch of AART 22 to the address lines of analogue multiplexers 23. The analogue multiplexers respond by interconnecting their source lines 25 with a unique one of the eight target lines 26. Thus a single path to one of the up to eight COMMOD head-ends (as described in conjunction with FIG. 4) is made.

What is claimed is:

1. A CATV monitoring system for monitoring utilization by CATV subscribers of TV channels distributed over a CATV distribution line, said CATV monitoring system comprising:
    a subscriber status monitor for connection between said CATV distribution line and a subscriber TV for delivering a selected TV channel from said CATV distribution line to said subscriber TV, said subscriber status monitor further comprising,
        CATV signal filter means responsive to a subscriber generated activation signal to block out or pass a TV channel and to pass a status signal,
        status indicating means including a pair of optoisolators connected through RF block means to said CATV filter means, said RF block means for preventing said TV channel from propagating into said status indicating means and for transmitting said status signal to said optoisolators to drive one and only one of said optoisolators to produce an output status signal indicating whether said TV channel is blocked out or delivered to said CATV subscriber TV,
    DC block means for preventing said status signal from propagating into said CATV distribution line, and
    means responsive to a unique electrically encoded address signal received over a communications bus for transmitting back over said communications bus said output status signal received from said status indicating means.

2. The CATV monitoring system of claim 1 wherein said communications bus is a dedicated pair of telephone lines.

3. The CATV monitoring system of claim 2, wherein said means responsive to said unique electrically encoded address signal comprises an addressable asynchronous receiver/transmitter.

4. The CATV monitoring system of claim 3, which further comprises a power supply means connected to said communications bus for receiving power from said communications bus and delivering power to said addressable asynchronous receiver/transmitter, and to said status indicating means.

5. An automated system for monitoring the viewing of TV channels distributed over a CATV distribution line to a plurality of subscriber televisions, said system comprising:
    (a) at least one communications device connected between said CATV distribution line and a plurality of said subscriber televisions for monitoring utilization by each subscriber of the TV channels distributed over said CATV distribution line, said at least one communications device including a subscriber status monitor connected between each of the televisions and said CATV distribution line for delivering one or more of said TV channels to said each of the televisions, said subscriber status monitor further comprising,
        CATV signal filter means responsive to a subscriber generated activation signal to block out or pass said one of the TV channels and to pass a status signal; DC block means for preventing said status signal from propagating into said distribution line,
        status indicating means electrically connected to said CATV signal filter means and driven by said status signal for producing an output status signal indicating whether said TV channels are blocked out or delivered to said subscriber televisions, including a pair of optoisolators connected through a RF block means for preventing said one of the TV channels from propagating into said status indicating means and for transmitting said status signal to said optoisolators to drive one and only one of said optoisolators to produce said output status signal, and
        means responsive to a unique electrically encoded address signal received over a communications bus for transmitting over said communications bus the output status signal of said status indicating means;
    (b) at least one subscriber operable activation unit electrically connected to at least one communications device at each subscriber location for selectively applying said status signal to said filter means;
    (c) polling means for repetitively producing said unique electrically encoded address signal on said communications bus and detecting a resultant output status signal; and
    (d) storage means for recording said encoded address and resultant output status signals and storing an amount of time each subscriber has activated access to said TV channels.

6. The system of claim 5, wherein said communications bus is a dedicated pair of telephone lines.

7. The system of claim 6, wherein said means responsive to said unique electrically encoded address signal comprises an addressable asynchronous receiver/transmitter.

8. The system of claim 7, wherein said status signal is indicative of a TV channel activation condition, a TV channel not activated condition, a no power condition or a fault status condition.

* * * * *